US005144292A

United States Patent [19]

Shiraishi et al.

[11] Patent Number: 5,144,292

[45] Date of Patent: Sep. 1, 1992

[54] LIQUID CRYSTAL DISPLAY SYSTEM WITH VARIABLE BACKLIGHTING FOR DATA PROCESSING MACHINE

[75] Inventors: Tomikatsu Shiraishi; Isao Kawano, both of Nara, Japan

[73] Assignee: Sharp Kabushiki Kaisha, Osaka, Japan

[21] Appl. No.: 886,423

[22] Filed: Jul. 17, 1986

[30] Foreign Application Priority Data

Jul. 17, 1985 [JP] Japan ............................ 60-158580

[51] Int. Cl.[5] ............................................ G02F 1/13

[52] U.S. Cl. ................................ 340/784; 340/793; 359/48

[58] Field of Search ............... 340/784, 765, 793, 716; 350/345; 359/48

[56] References Cited

U.S. PATENT DOCUMENTS 3,674,341 7/1972 Hedman et al. .................... 350/345
4,251,755 2/1981 Bryden ............................... 340/793
4,319,237 3/1982 Matsuo et al. ...................... 340/784
4,500,173 2/1985 Leibowitz et al. ................... 350/345
4,655,553 4/1987 Klein ................................. 350/345

FOREIGN PATENT DOCUMENTS 2038055 7/1980 Japan ................................ 340/784

OTHER PUBLICATIONS

Patents Abstracts of Japan, vol. 8, No. 79 (P-267) [1516], Apr. 11, 1984; & JP-A-58 221 828 (Sharp K. K.) Dec. 23, 1983 *Abstract*.
Patents Abstracts of Japan, vol. 8, No. 211 (P-303) [1648] Sep. 26, 1984; & JP-A-59 94 740 (Toshiba K.K.) May 31, 1984 *Abstract*.

*Primary Examiner*—Alvin E. Oberley

[57] ABSTRACT

A data processing device is provided with a liquid crystal display incorporating electroluminescent backlighting, in which the electroluminescent backlighting panel is provided with several degrees of luminosity. A selection circuit specifies the degree of luminosity to allow the electroluminescent backlighting panel to generate the selected luminosity level.

5 Claims, 4 Drawing Sheets

LIQUID CRYSTAL DISPLAY SYSTEM WITH VARIABLE BACKLIGHTING FOR DATA PROCESSING MACHINE

BACKGROUND OF THE INVENTION

The present invention relates to a data processing device which is provided with a liquid crystal display having electroluminescent backlighting. Normally, manufacturers are required to design displays as small as possible so that data processing machines may be made more compact. Liquid crystal display devices are available to help realize this goal, but since they cannot illuminate themselves, such displays are usually dark and often indecipherable. There has been proposed a device equipped with an electroluminescent panel to provide the necessary backlighting. However, use at a high level of luminosity considerably shortens the service life of electroluminescent panels.

SUMMARY OF THE INVENTION

The primary aim of the present invention is to provide a novel data processing device which allows an operator to change the luminosity level of the electroluminescent panel in accordance with the lighting conditions under which the data processing device is operated.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the att from this detailed description.

Briefly described, the present invention pertains to a data processing device which is provided with a liquid crystal display unit having electroluminescent backlighting. The backlighting panel is provided with several degrees of luminosity and means for selecting a specific degree of luminosity in order to allow the electroluminescent panel to emit light of a specific luminosity level.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
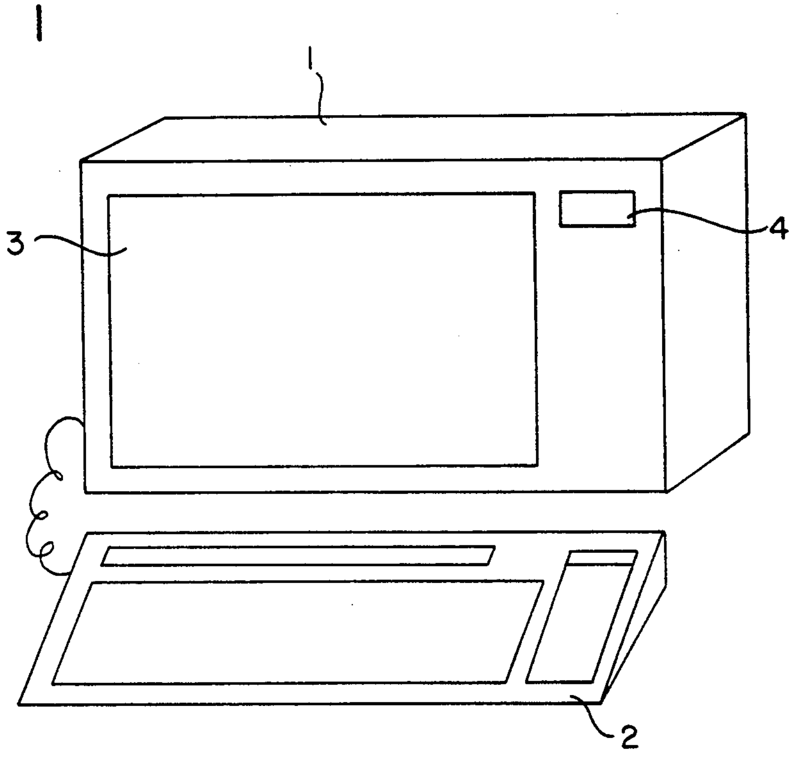
FIG. 1 is an external view of the data processing device reflecting one of the preferred embodiments of the present invention.
Figure 2:
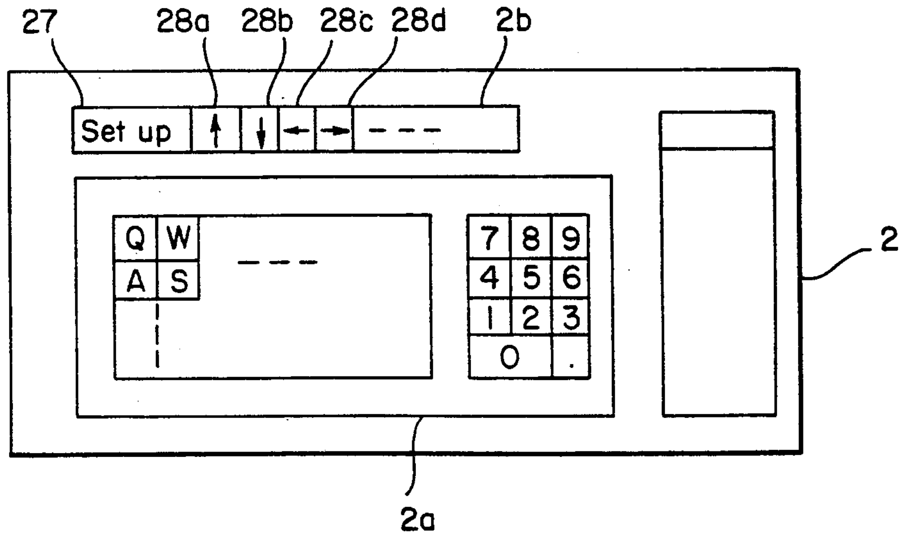
FIG. 2 is an arrangement of keys associated with the data processing device shown in FIG. 1.
Figure 3:
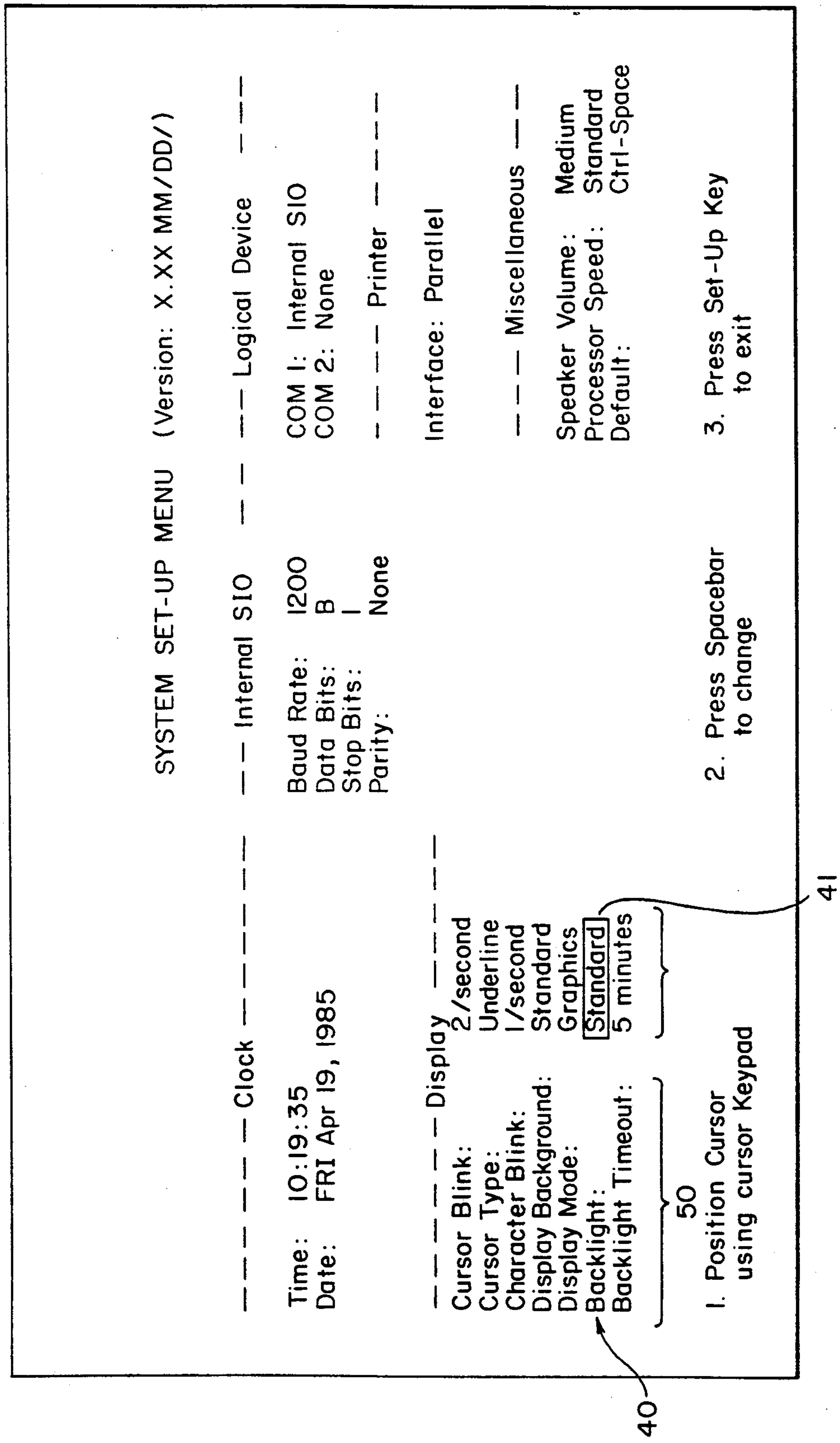
FIG. 3 is a typical example of a set-up menu display of the data processing device of FIG. 1.

Referring now to the accompanying drawings, one of the preferred embodiments of the present invention is described below. FIG. 1 is an external view of a data processing device reflecting one of the preferred embodiments of the present invention. In FIG. 1, a liquid crystal display unit 3 is provided at the front of a data processing device 1. A keyboard 2 is electrically connected to the data processing device 1. As shown in FIG. 2, the keyboard 2 is provided with a number of data input keys **2*a* and function keys 2*b* for generating control commands. The function keys 2*b* include a SET-UP key 27, which displays a set-up menu for setting the initial data processing mode of the device, and cursor keys 28*a*, 28*b*, 28*c*, and 28*d*. The set-up menu depicted in FIG. 3 is displayed by actuating the set-up key 27. In FIG. 1, the reference numeral 4** denotes a lamp which is described below.

Figure 4:
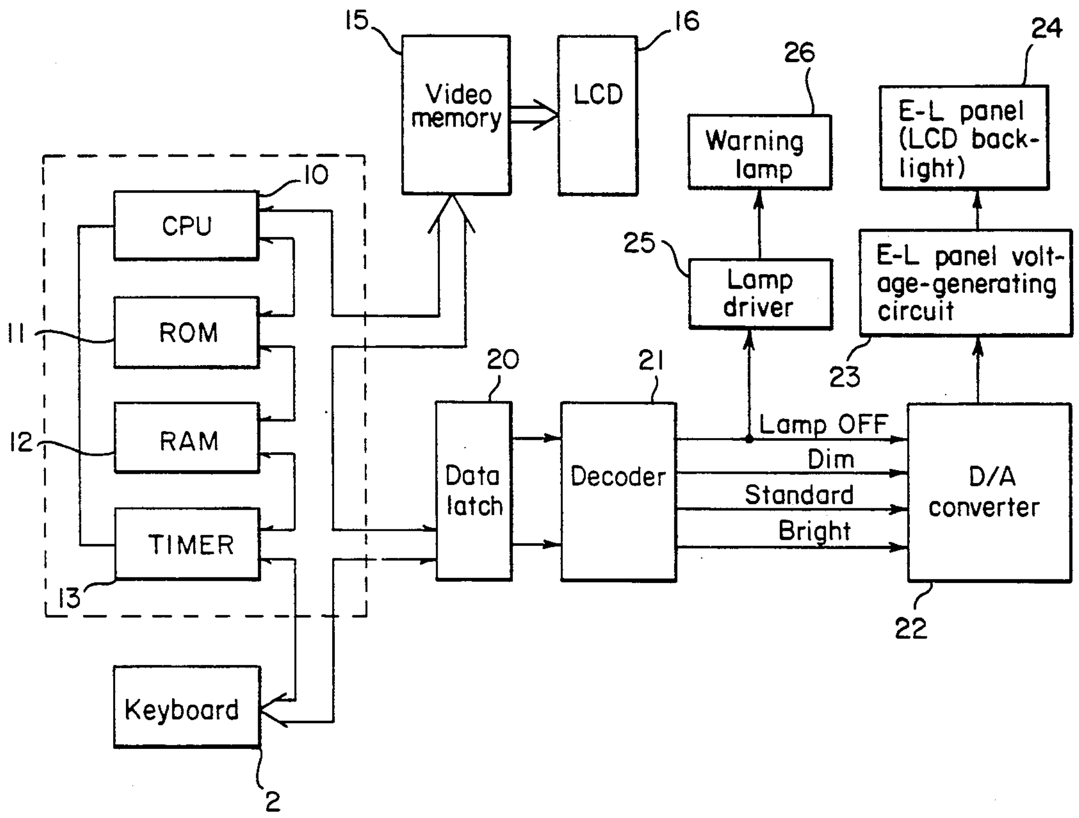
FIG. 4 is a simplified block diagram of the data process device related to the present invention.

FIG. 4 is a simplified block diagram of the data processing device embodied by the present invention. This is a detailed representation of the electroluminescent panel drive controller. The block surrounded by the broken line denotes the controller. A main controller CPU 10 executes control operations in accordance with system programs stored in a read-only memory ROM 11, which stores the message data needed to display the set-up menu in addition to the system programs. A random access memory RAM 12 stores the various data being input or processed and also contains a variety of buffers, counters and flags. In this embodiment, the RAM 12 is provided with at least a cursor counter and a B counter storing the luminosity level code of the electroluminescent panel.

A timer 13, which counts a predetermined period of time, serves to turn off the electroluminescent panel light 24 so that it will not be damaged when the user operates the key input or other processes for more than the predetermined period of time. The panel 24 provides backlighting to the LCD device 16. A data latch 20 latches either the luminosity level code or the automatic OFF code of the B1 counter and drives an electroluminescent panel 24 in accordance with either of these code data. Code data stored in the data latch 20 is decoded by a decoder 21, which then outputs one of the four data signals shown below.

| DATA | LUMINOSITY LEVEL |
|---|---|
| 00 | OFF |
| 01 | Dim |
| 10 | Standard |
| 11 | Bright |

In accordance with the data signal output from the decoder 21, a D/A converter 22 converts the digital data signal into an analog data signal and controls the electroluminescent panel driver circuit 23 before generating the appropriate drive voltage (0V <OFF>, about 5V <dim>, about 6V <standard>, or about 8.5V <bright>) in the electroluminescent panel 24. The D/A converter 22 also drives a lamp driver 25 to illuminate a warning lamp 26 when the decoder 21 outputs an OFF signal.

Figure 5:
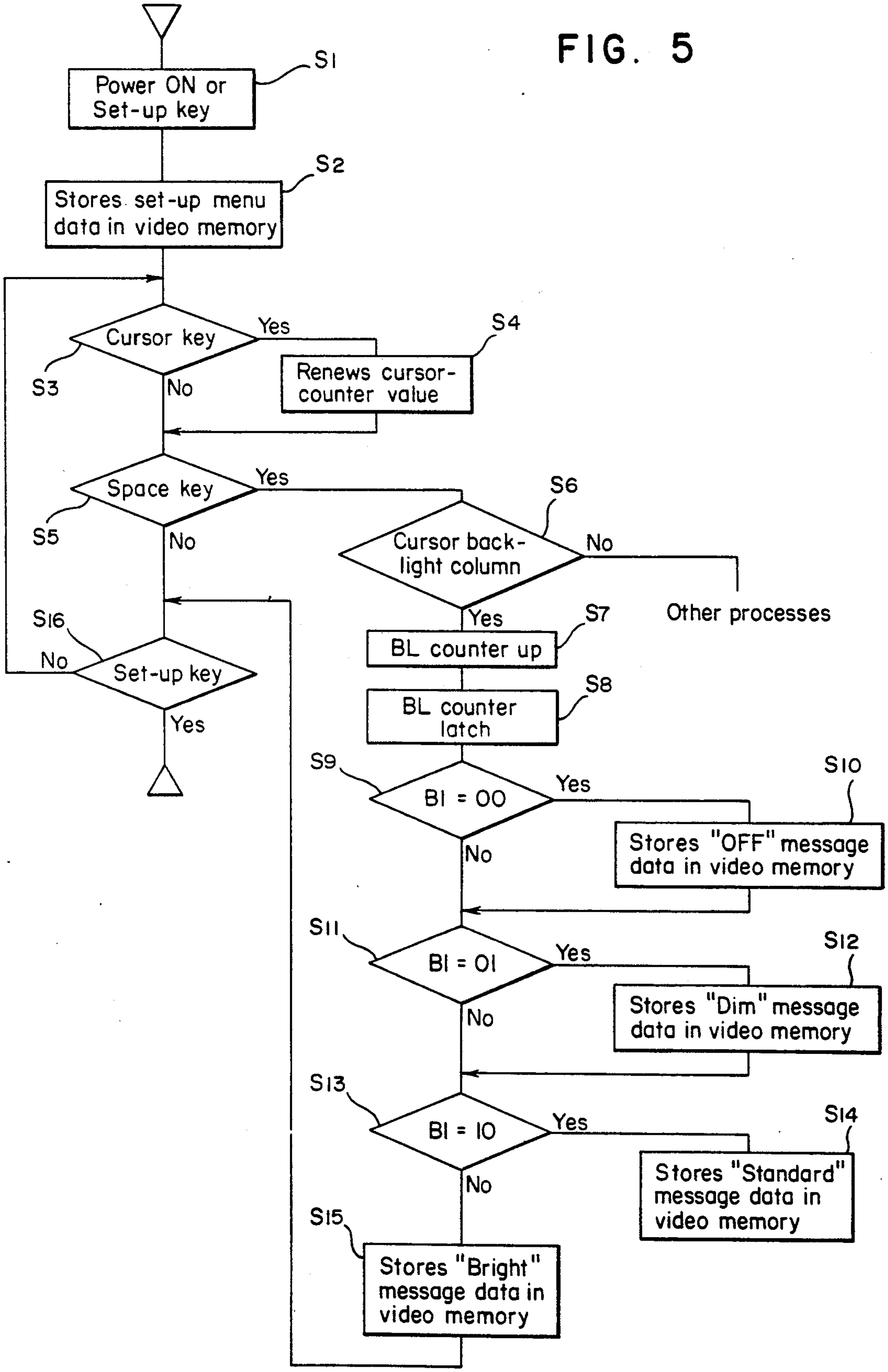
FIG. 5 is a flowchart describing the processes needed to set a specific luminosity level of the electroluminescent backlighting panel of the data processing device embodied by the present invention.

Referring now to the operation flowchart shown in FIG. 5, the luminosity modification operation of the electroluminescent panel 24 is described below.

(1) Step S1: When the power switch of the data processing device is turned ON or the set-up key 27 is pressed, the data processing machine begins the luminosity modification operation.

(2) Step S2: In accordance with the system program in the ROM 11, the menu data shown in FIG. 3 is stored in a video memory 15. The menu data, including 50 mode names and either the preset mode or preset mode status, are displayed in accordance with the internal memory of the RAM 12.

(3) Steps S3 and S4: The operator designates a specific column to be set by operating the cursor key to move the cursor 40. The content of the cursor counter is renewed whenever the cursor key is operated so that a specific value corresponding to the designated column can be latched.

(4) Steps S5 and S6: The luminosity level is changed by first moving the cursor position to the "Backlight" column, thereby accessing the luminosity changing mode, and then pressing the space key (other keys may also be operated).

(5) Steps S7 and S8: The B counter adds up each movement of the space key, and each counter value is transferred to the data latch 20. This activates the driving of the electroluminescent panel 24 using the specific luminosity level that matches the luminosity level data code.

(6) Steps S9 through S15: During these steps, one of the following messages is displayed in a mode display column 51 of the menu as shown in FIG. 3:

| | |
|---|---|
| When B register = 00 | "OFF" |
| When B register = 01 | "Dim" |
| When B register = 10 | "Standard" |
| When B register = 11 | "Bright" |

(7) Step S16: The user repeats the operation of steps S9 through S15 until the desired mode is entered. After the desired mode has been set, the operator again presses the set-up key to complete the set-up process before commencing with data processing.

When, following automatic shut-off of the electroluminescent panel 24, the user again activates the panel, its luminosity level will be set according to the B1 counter.

It should be noted that the luminosity settings of the electroluminescent panel in the set-up menu used in the data processing device related to the present invention are not limitative of the preferred embodiment described above. Furthermore, the degrees of luminosity are not limited to the four levels specified using a keyboard, as mentioned above.

As is clear from the foregoing description, according to the present invention related to a data processing device provided with a liquid crystal display incorporating electroluminescent backlighting, the preferred embodiment provides for several degrees of luminosity and means for specifying luminosity levels. This enables the operator manually to adjust the luminosity ideally suited to the lighting environment in which the data processing device is used. At the same time, the system ensures a longer service life for the electroluminescent backlight, thereby reducing maintenance and replacement costs.

While only certain embodiments of the present invention have been described, it will be apparent to those skilled in the art that various changes and modifications may be made therein without departing from the spirit and scope of the present invention as claimed.

What is claimed is:

1. A data processing machine, comprising:
   - memory means for storing control instructions and data;
   - processing means for executing said control instructions and processing said data;
   - liquid crystal display means for displaying data, including an electroluminscent backlighting panel;
   - means for driving said electroluminescent backlighting panel at several levels of luminosity; and
   - means for selecting a specific level of luminosity to cause said driving means to drive said electroluminescent backlighting panel at said specific level;
   - said means for selecting including a data latch circuit which outputs a specific luminosity level code to said means for driving.

2. The data processing machine as claimed in claim 1, wherein said several levels of luminosity comprise a plurality of discrete values.

3. The data processing machine as claimed in claim 1, wherein said several levels comprise at least two discrete values.

4. The data processing machine as claimed in claim 3, wherein said several levels comprise four levels.

5. The data processing machine as claimed in claim 1, wherein said means for selecting comprises a keyboard.

* * * * *